Patented Feb. 8, 1927.

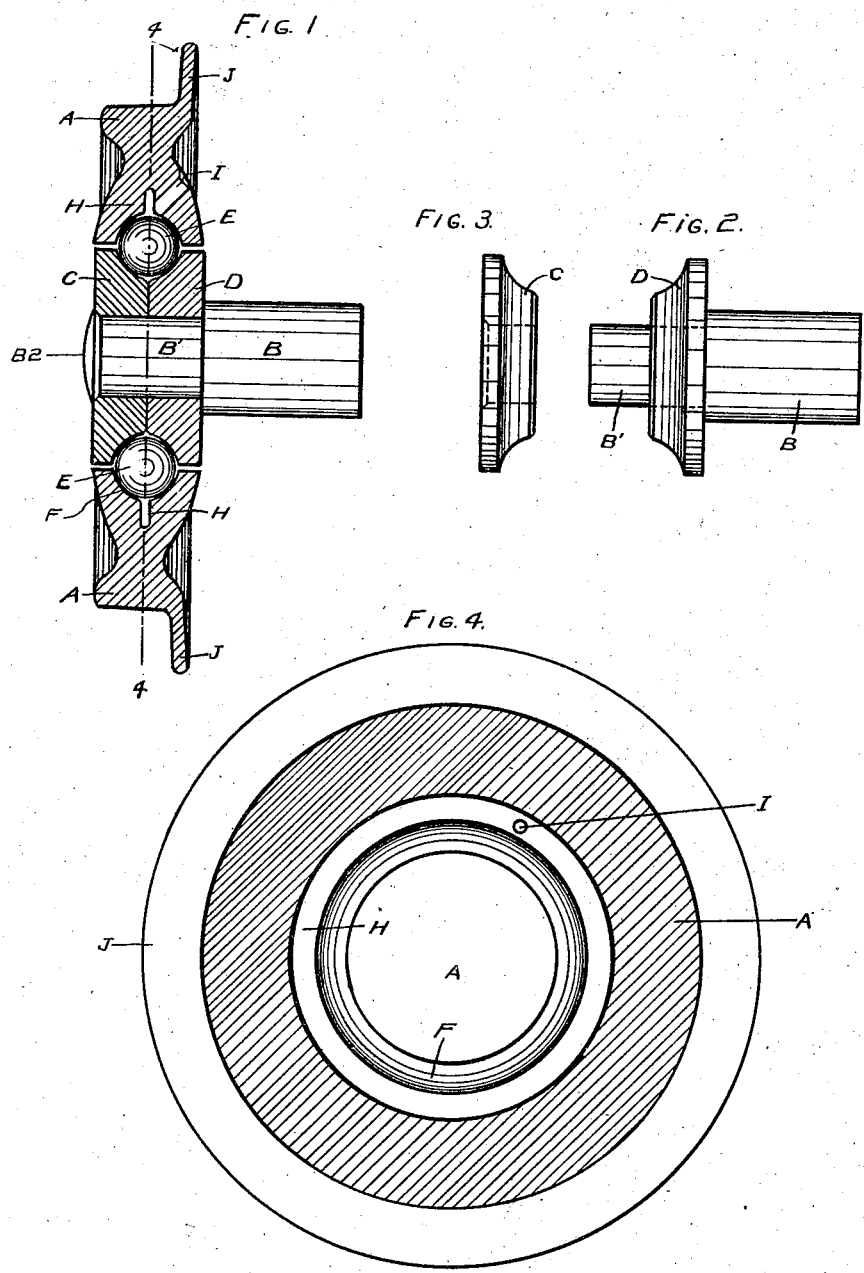

1,617,085

UNITED STATES PATENT OFFICE.

WALTER E. SPECHT, OF MOLINE, ILLINOIS, ASSIGNOR TO THE LOUDEN MACHINERY COMPANY, OF FAIRFIELD, IOWA.

TROLLEY WHEEL.

Application filed August 20, 1926. Serial No. 130,477.

My invention relates to wheels designed to carry loads on overhead tracks, and it consists of an improvement in the construction of the wheel whereby the friction in running on the track will be reduced to the minimum, and at the same time the simplicity and durability of the wheel will be preserved. Also, of other improvements which will be herein described and set forth in the claims.

In the accompanying drawings, forming a part of this specification, Fig. 1 is a transverse section of a wheel and its attachments embodying my invention, some of the attachments being shown in side view. Fig. 2 is a side elevation of an axle for the wheel with an attachment mounted thereon. Fig. 3 is a side view of a mating attachment detached from the axle. Fig. 4 is a section on line 4—4 of Fig. 1, the attachments of the wheel being removed.

Referring to the drawing, A represents a trolley wheel having a circular opening A' transversely through its center, and B is an axle upon which the wheel is mounted. The axle is provided with a shouldered end B' and its other end is adapted to be connected to a trolley frame of any suitable type, but which is not shown in the drawing. C and D are a pair of bearing rings which are adapted to be mounted on the shouldered end of the axle. These rings are preferably rectangular in cross section and are of a size to loosely fill the transverse opening in the center of the wheel.

In the center of the portion of the wheel surrounding the transverse opening, a substantially semi-circular ball race groove is circumferentially cut, which is adapted to receive a series of bearing balls E. In the meeting edges of the bearing rings C and D a similar ball race groove is cut, one half of said groove being in the adjacent edge of each of the rings. The groove in the wheel is represented by F, as shown in Figs. 1 and 4. In addition, a smaller groove H is cut circumferentially around the central part of the wheel surrounding the groove F, and an opening I leading into the groove F is cut in the wheel.

The purpose of the groove H and the opening I is to admit a lubricant into the groove F and from that on to the balls E contained therein, which will be carried by the balls E to the groove in the edges of the bearing rings C and D. By this means all the bearing surfaces can be thoroughly lubricated and the surplus lubricant will be held in the portion of the groove H in the lower side of the wheel, while the lubricant in the portion of the groove in the upper side of the wheel will be evenly distributed over the balls E and on to the portion of the groove in the bearing rings C and D immediately below.

The outer edge of the wheel A should be made to fit the contour of the track on which it is to run. As shown in Figs. 1 and 4, it is provided with a transversely flat surface, on one edge of which there is a flange J. This form of wheel is designed to run on one edge of a flat track, or on one edge of a flat flange of the track. As a general rule two wheels of this form are used, one wheel on each side of the track with a trolley frame connecting the wheels together. Various structures of trolley frames and tracks may be used with my improved trolley wheel, but the form of the trolley frame or track will not affect advantages of my invention.

In assembling the parts, it is preferable to first place the bearing ring D on the shouldered end B' of the axle, driving it down against the shoulder and shrinking or otherwise rigidly fastening it there, so it will stay securely in place. The wheel A is then held in a horizontal position with the flange J on the lower side. The shouldered end of the axle with the ring D thereon is then passed up into the circular transverse opening in the wheel. The requisite number of balls E are then dropped into the groove F and the corresponding groove in the edge of the ring D.

Following this the ring C is placed on the upwardly extending end of the axle until the groove in its adjacent edge comes in contact with the balls in position therein, and the adjoining sides of the rings C and D will be in contact. When this is done all that remains is to fasten the ring C in place on the end of the axle. This may be done in a number of ways known to those skilled in the art, but a preferable way is to form a slight recess in the outer edge of the opening in the ring C, and then rivet down the end $B^2$ of the axle to fill this recess, which will hold the ring securely in place on the axle.

My invention is the essence of simplicity, all supplemental parts being carefully excluded. It is also exceedingly efficient and durable, a wheel thus equipped having run several thousand miles before becoming worn or needing repair.

What I claim and desire to secure by Letters Patent is—

1. In trolley wheels, the combination of a wheel having a circular opening transversely through its center, a substantially semicircular ball race groove cut circumferentially in the central portion of the wheel surrounding said opening, an axle adapted to be connected to a trolley frame, a pair of bearing rings mounted on the axle adjoining each other, said rings being substantially rectangular in cross section and of a size to loosely fill the transverse opening in the wheel, a substantially semicircular ball race groove cut circumferentially in the adjoining edges of the rings, a series of balls mounted in the grooves cut in the wheel and in the adjoining edges of the rings, said balls being adapted to carry the weight of the trolley on the wheel, a smaller groove being circumferentially cut in the wheel outside of and adjoining the central portion of the ball race groove said smaller groove forming a receptacle for a lubricant, and an opening in the wheel to admit a lubricant into said smaller groove to lubricate the bearings in the ball race grooves, and means to securely connect the rings to the shaft.

2. In trolley wheels, the combination of a wheel having a circular opening transversely through its center, a substantially semicircular ball race groove cut circumferentially in the central portion of the wheel surrounding said opening, an axle having a shouldered end, its other end being adapted to be connected to a trolley frame, a bearing ring substantially rectangular in cross section, and of a size to loosely fill the opening in the wheel, said ring being rigidly affixed to the shouldered end of the axle against the shoulder and its edge away from the shoulder of the axle being cut away to form one half of a substantially semicircular ball race groove corresponding with the groove in the wheel, a series of balls placed in said grooves, a mating ring having a similar groove in its adjacent corner adapted to be slid on the shouldered end of the axle, whereby the balls will be held in place in the grooves, and means to rigidly secure said ring to the axle.

WALTER E. SPECHT.